United States Patent [19]

Smith et al.

[11] 4,338,985

[45] Jul. 13, 1982

[54] TREE AND BRUSHWOOD HARVESTER

[75] Inventors: Frederick M. Smith, Ashley County, Ark.; James R. O'Dair, Rapides Parish, La.

[73] Assignee: Georgia-Pacific Corporation, Portland, Oreg.

[21] Appl. No.: 86,575

[22] Filed: Oct. 19, 1979

[51] Int. Cl.$^3$ .............................................. A01G 23/08
[52] U.S. Cl. ................................. 144/34 R; 56/13.9; 56/16.6; 56/503; 83/167; 241/101.7; 298/13; 144/337
[58] Field of Search .................... 56/13.9, 503, 16.6, 56/15.9; 83/167, 928; 241/101.7; 298/7, 13, 18, 22 R, 17 S; 144/2 R, 34 R, 3 D, 34 E, 309 AC

[56] References Cited

U.S. PATENT DOCUMENTS

| | | |
|---|---|---|
| 1,012,892 | 12/1911 | Moody . |
| 1,778,866 | 10/1930 | Ochsner ............................. 298/13 |
| 1,867,844 | 7/1932 | Jungersen ........................... 298/13 |
| 1,897,067 | 2/1933 | Miller ................................. 298/13 |
| 1,903,335 | 4/1933 | Falkiner .............................. 56/13.9 |
| 2,537,404 | 1/1951 | Garretson ........................... 56/13.9 |
| 2,857,946 | 10/1958 | Nikkel ................................. 241/277 |
| 2,947,571 | 8/1960 | Hagen ................................. 56/16.6 |
| 3,121,987 | 2/1964 | Harris ................................. 56/13.9 |
| 3,356,116 | 12/1967 | Brundell et al. ................... 144/3 D |
| 3,451,494 | 6/1969 | Kowalik .............................. 180/235 |
| 3,543,819 | 12/1970 | Peltola ................................ 144/3 D |
| 3,643,709 | 2/1972 | McColl ............................... 144/3 D |
| 3,659,404 | 5/1972 | Kerhan ............................... 56/13.9 |
| 3,673,779 | 7/1972 | Scarnato ............................. 56/13.9 |
| 3,676,988 | 7/1972 | Hauser-Lienhard ................ 56/1 C |
| 3,822,534 | 7/1974 | Martin ................................ 56/13.9 |
| 3,848,399 | 11/1974 | Makeham ............................ 56/13.9 |
| 3,861,602 | 1/1975 | Smith ............................. 241/101.7 X |
| 3,863,848 | 2/1975 | Mashuda ........................... 241/101.7 |
| 3,915,209 | 10/1975 | Denis ................................. 144/34 R |
| 3,955,765 | 5/1976 | Gaitten ........................... 241/101.7 X |
| 3,979,075 | 9/1976 | Heron ............................ 241/101.7 X |
| 3,981,336 | 9/1976 | Levesque ............................ 144/3 D |
| 3,996,980 | 12/1976 | Pallarri .............................. 144/34 E |
| 4,014,373 | 3/1977 | Smith .................................. 144/3 D |
| 4,019,308 | 4/1977 | Quick .................................. 56/13.9 |
| 4,043,366 | 8/1977 | Pallarri .............................. 144/34 E |
| 4,057,192 | 11/1977 | Smith .................................. 241/92 |
| 4,078,590 | 3/1978 | Smith ............................ 241/101.7 X |
| 4,200,334 | 4/1980 | Lindholm ............................. 298/7 |
| 4,232,719 | 11/1980 | Payton .............................. 144/34 R |
| 4,236,554 | 12/1980 | Nicholson ......................... 144/326 R |

FOREIGN PATENT DOCUMENTS 1029283 4/1978 Canada .

*Primary Examiner*—W. D. Bray
*Attorney, Agent, or Firm*—Schuyler, Banner, Birch, McKie and Beckett

[57] ABSTRACT

A machine for clearing and cleanly chipping trees and brushwood in the path of the machine as it moves forward. A pair of counterrotating disk cutters cut a kerf in the standing material and propel the cut material upwardly and rearwardly to the throat between a pair of feed rollers. The feed rollers deliver the cut material to a chipper, which reduces the material to chips and delivers them to a chip storage bin. The bin can be tilted to dump chips alongside the machine. The entire mechanism is carried by a self-propelled, articulated, track-supported vehicle which is especially well-suited for operation over soft, boggy ground.

23 Claims, 14 Drawing Figures

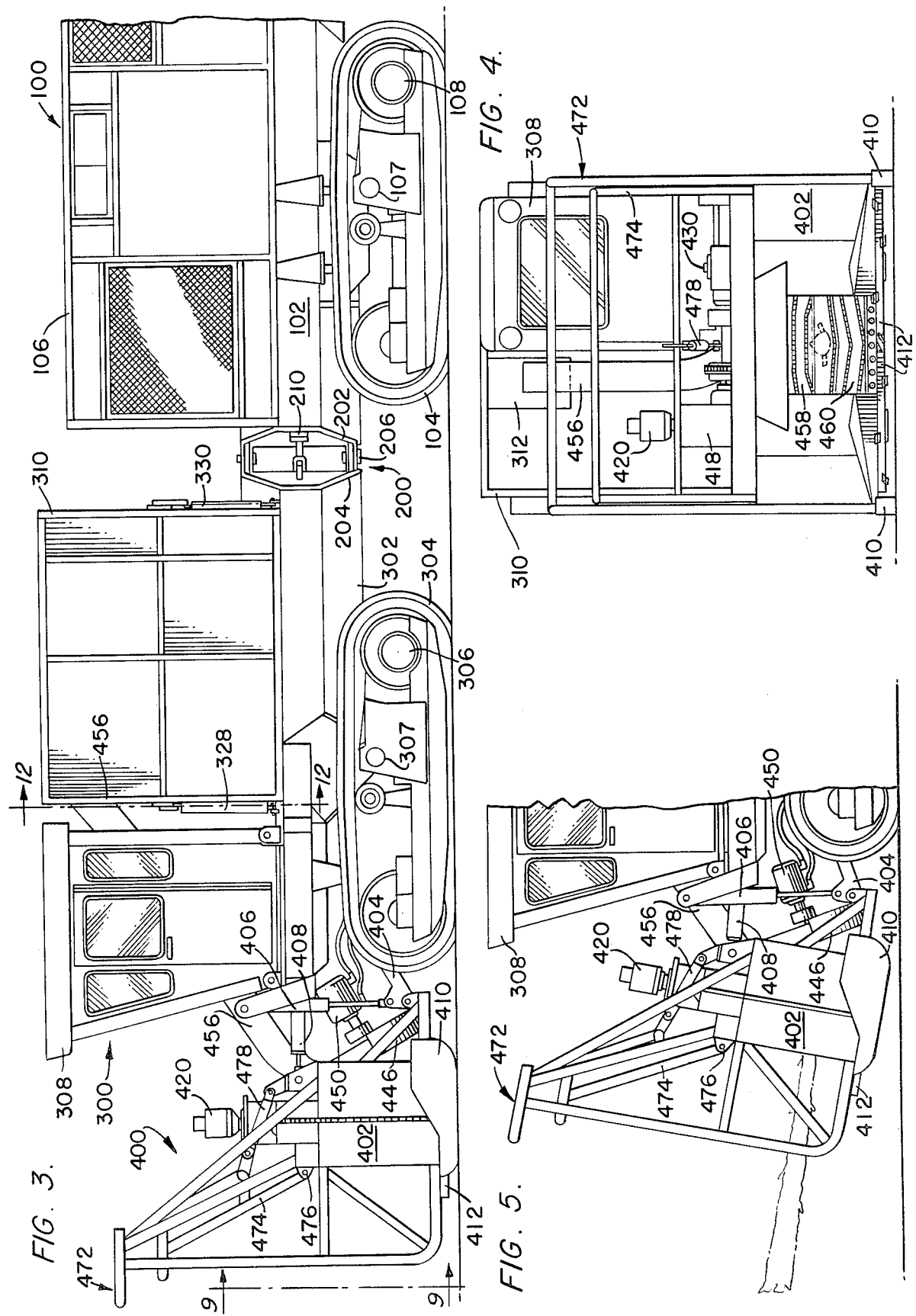

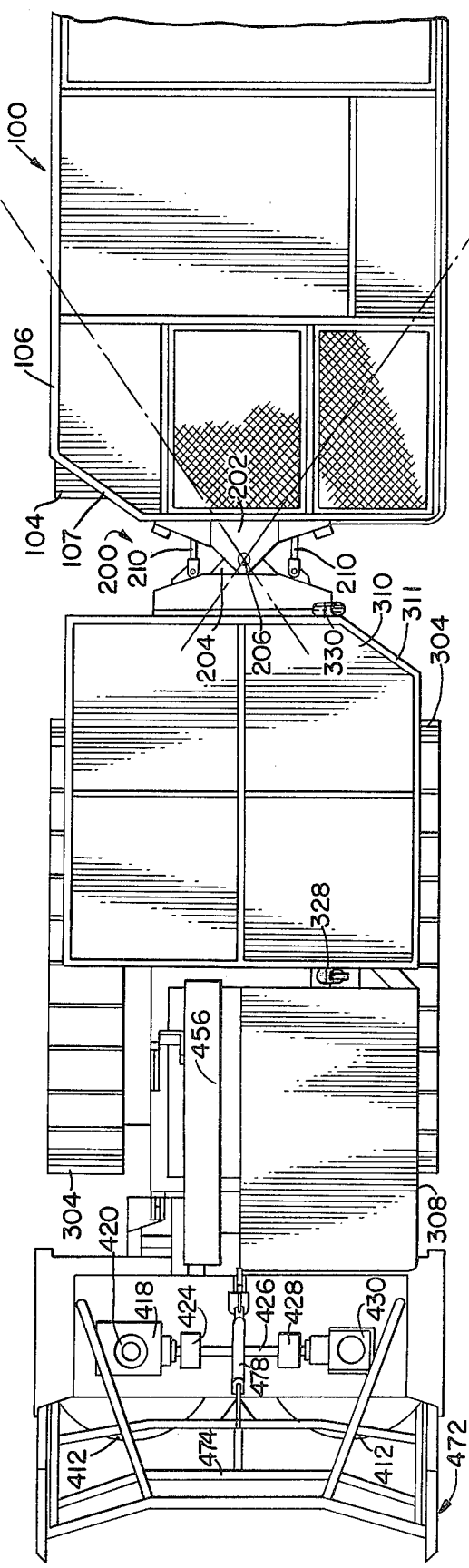
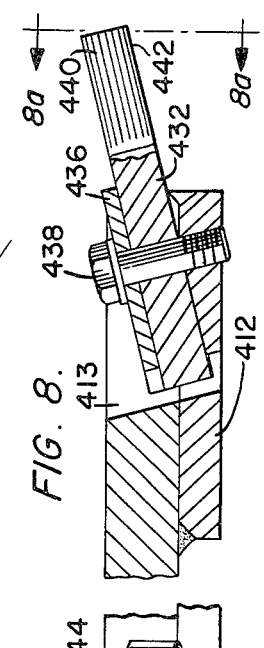
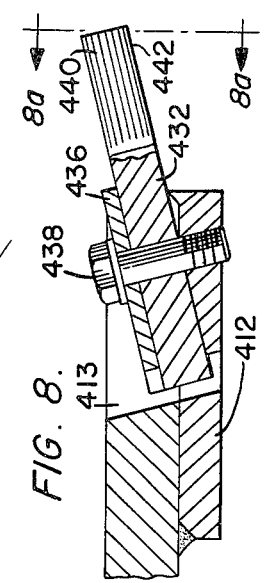
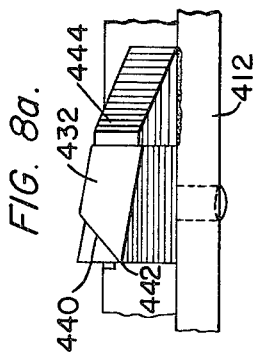
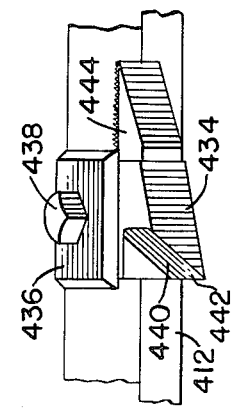
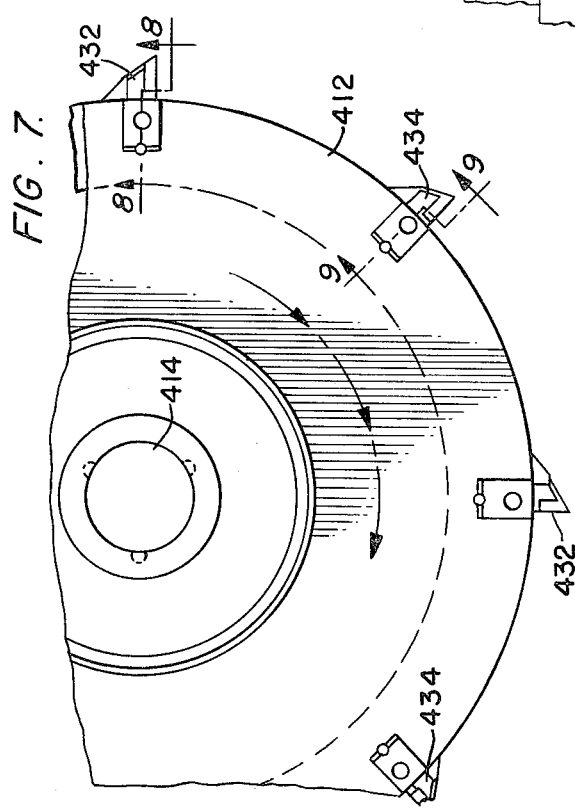

TREE AND BRUSHWOOD HARVESTER

BACKGROUND OF THE INVENTION

1. Field of the Invention

The present invention relates generally to clearing machines for trees and brushwood and, more particularly, to a clearing machine which harvests trees and brushwood and reduces the same to chips for subsequent use.

2. Description of the Prior Art

In contemporary forestry management, a maximum yield of lumber per acre of timberland is obtained by taking steps to insure that harvestable trees of substantial size are grown as rapidly as possible. One of these steps involves the removal of adjacent smaller trees and brushwood which would otherwise compete with the larger trees for soil nutrients and moisture and slow the growth of the larger trees. Elimination of this competition can significantly increase merchantable growth per year.

In the past, competing trees and brushwood have been eliminated by the application of herbicides, or by controlled or prescribed burning. However, recent public concern over, and legislation against pollution of the environment has rendered these two methods undesirable in certain instances, if not unavailable. Herbicides and controlled burning are not as selective as mechanical cutting. In addition, overspraying of herbicides or overspreading of flames often kills some trees which would otherwise have been harvested if permitted to grow to maturity. Herbicide application, controlled burning and mechanical cutting without harvesting have been performed on undesirable trees and brush in many other areas, such as rights of way under power lines, rangeland and the like.

Brushwood and small trees which are burned amount to a totally wasted energy source. If this material could be harvested and converted into a smaller form, such as chips, it would represent a new energy source capable of providing, for example, an appreciable portion of the fuel required to fire the boilers and other equipment in paper making mills and the like. It is estimated that the brushwood and trees harvested from one acre of timberland can yield as much as fifteen tons (1200 cu. ft.) of chips, depending on the growth density. However, there are many obstacles to be overcome in the design a machine capable of doing this. In southern timberlands, for example, the earth is fairly flat but often quite soft or boggy due to a high moisture content. Ordinary wheeled vehicles supporting the heavy machinery necessary to accomplish these tasks would exert unacceptably high earth loading pressures on soil of this type, resulting in undesirable loss of maneuverability, root damage, soil compaction, disruption of the naturally occurring nutrient layers, and increased soil erosion.

One proposed solution for accomplishing some of these objectives is disclosed in Pallarri U.S. Pat. No. 3,996,980. The machine there described has a harvesting head mounted at the front of a tractor-type wheeled vehicle. The harvesting head comprises a pair of counterrotating shearing blade assemblies which cut brush and small trees in the path of the machine close to the ground as the machine moves forward. Two vertical feed rollers deliver the cut material rearwardly of the machine to a chipper, which reduces the cut material to chips. The chips may be deposited on the ground or onto a chip loading bed towed behind the tractor. One major drawback of this machine is that it is not capable of cutting and chipping trees larger than 6 inches in diameter. It is very often desirable to be able to remove larger trees, up to 12 or 15 inches in diameter, which compete with harvestable timber, but which are too small for any practical use.

Other types of machines are available which may cut and/or chip selected trees, but these must be carefully maneuvered into position to harvest these selected trees and are not capable of clearing all of the smaller brushwood in their paths as they move forward. Many of these machines deposit the cut material directly on the ground and then drag it along the ground to a chipper. The dirt which then adheres to the material tends to foul and rapidly wear the equipment, and must be washed from the chips prior to their subsequent use.

A strong need therefore exists for a nonpolluting device which is capable of clearing and cleanly chipping brushwood and trees of a size up to approximately 15 inches in diameter, where this vegetation would compete with harvestable trees of larger size.

SUMMARY OF THE INVENTION

Accordingly, it is an object of the present invention to provide a machine which will economically harvest brushwood and trees which heretofore have been destroyed.

Another object of the invention is to provide such a machine which will not pollute the environment.

Another object of the invention is to provide such a machine which can be easily operated and maneuvered over soft or boggy ground and in somewhat dense forest.

Another object of the invention is to provide such a machine which will harvest brushwood and trees without permitting the harvested material to come into contact with the ground, and will reduce the harvested material to clean chips for subsequent use.

Another object of the invention is to provide such a machine which is capable of on board storage of a substantial quantity of chips so as to avoid inefficient frequent dumping thereof.

These and other objects of the present invention are accomplished by providing a mobile, self-propelled brush and tree harvester having cutting means for cutting brush and trees above and close to the ground, chipping means for reducing the cut material to chips, and feeding means for feeding the cut material from the cutting means to the chipping means, wherein the cutting means comprises unique saw-type cutting teeth and means for moving the teeth to simultaneously cut a kerf in the brush and trees and lift the cut material toward the feeding means as the harvester advances forwardly into the brush and trees to be cut. The term "saw-type" is intended to encompass any cutting tooth which cuts a kerf or notch as it moves through material, as distinguished from shearing-type cutting means which shear material with a scissor-like action between two converging surfaces.

The harvester may comprise a forward control chassis mounted on a pair of driven endless tracks. A harvesting head is attached to the front of the control chassis and comprises the cutting means, chipping means and feeding means. An aft power chassis is hinged to the rear of the control chassis and is also mounted on a pair of driven endless tracks. Steering means are provided which interconnect the control chassis and the power chassis for varying the articulated angle between the control chassis and the power chassis to steer the harvester. Power supply means mounted on the power chassis supply motive power to the endless tracks, steering means, cutting means, chipping means, feeding means and other harvester equipment. Control means are mounted on the control chassis for controlling the application of power to all of the harvester equipment.

A chip storage bin may be mounted on one chassis, with a chip conduit connected to the chipping means for directing chips to the bin. Chip unloading means are provided for tilting the bin to the side of the chassis to dump the chips therefrom.

BRIEF DESCRIPTION OF THE DRAWINGS

The novel features of the invention are set out with particularity in the appended claims, but the invention will be understood more fully and clearly from the following detailed description of the invention as set forth in the accompanying drawings, in which:

FIG. 3 is a side elevational view of the same;

FIG. 4 is a front elevational view of the same;

FIG. 5 is a side elevational view of the harvesting head shown in an upwardly tilted position;

FIG. 6 is a top plan view of the harvester;

FIG. 7 is a partial top plan view of one of the rotating disk cutters of the harvesting head;

FIG. 8 is a sectional view of one of the cutting teeth and tooth holders of the disk cutter taken along line 8—8 of FIG. 7;

FIG. 8a is an end elevational view of the same taken along line 8a—8a of FIG. 8;

FIG. 9 is a sectional view of another tooth and tooth holder of the disk cutter taken along line 9—9 of FIG. 7;

FIG. 9a is an end elevational view of the same taken along line 9a—9a of FIG. 9;

DESCRIPTION OF THE INVENTION

Figure 1:
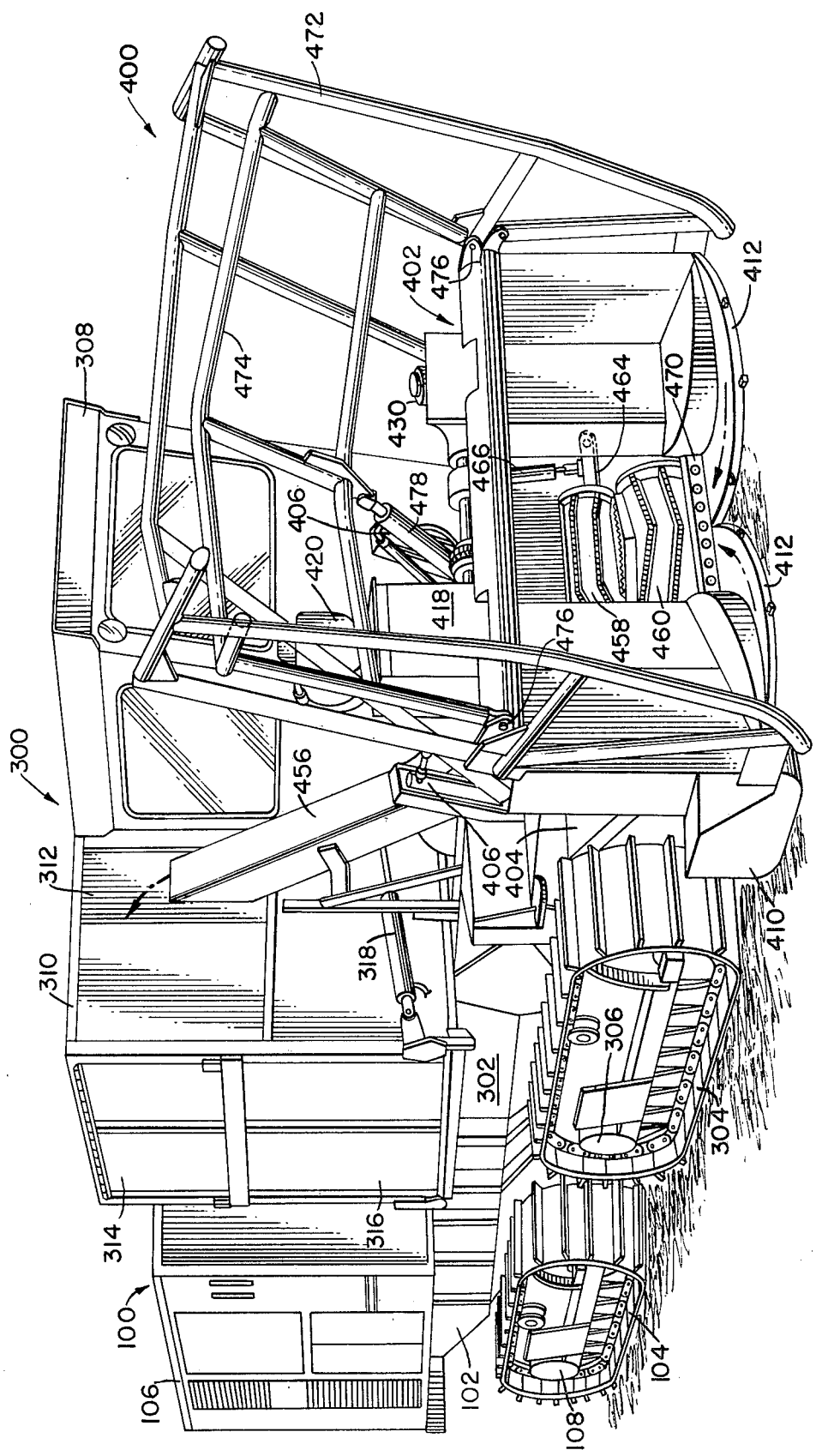
FIG. 1 is a perspective view of the complete harvester.
Figure 2:
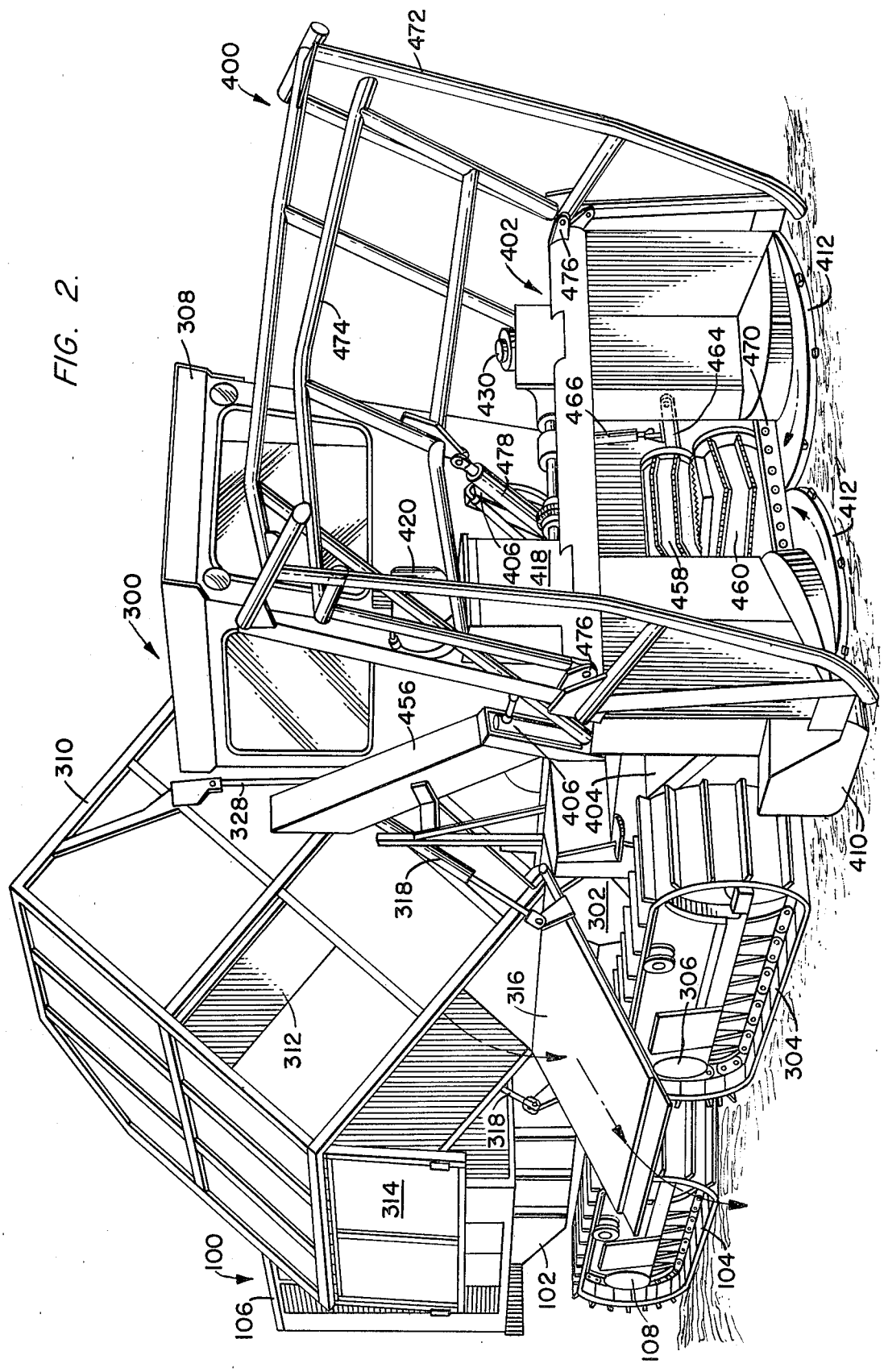
FIG. 2 is a perspective view of the same showing the chip storage bin in its tilted or unloading position.

Referring to FIGS. 1, 2, 3 and 6, the harvester according to the invention comprises a rear power section 100 which is pivotally connected at 200 to a forward control and chip storage section 300. A harvesting head 400 is mounted on the front end of control section 300.

Power section 100 comprises a chassis 102 longitudinally pivotally supported on a pair of endless tracks 104. A power plant, such as a diesel engine, and suitable hydraulic pumps, coolers, hydraulic reservoirs and electrical generating equipment are carried within power housing 106. Power section 100 thus provides pressurized hydraulic fluid and electrical power for operating the various components of the harvester. Tracks 104 are independently driven by separate hydrostatic drive motors 108, and independently pivoted at 107. A utility winch (not shown) may be carried at the rear end of power section 100.

Control and chip storage section 300 comprises a chassis 302 longitudinally pitotally supported on a pair of endless tracks 304. Tracks 304 are independently driven by separate hydrostratic drive motors 306, and independently pivoted at 307. Chassis 302 supports a control cab 308 which houses an operator's seat and all of the appropriate controls for operating the harvester. A chip storage bin 310 is also supported on chassis 302. The front wall of bin 310 has an opening 312 through which chips are propelled from the harvesting head 400. The right side of bin 310 comprises an upper door section 314 hinged to the upper edge of the bin, and a lower door section 316 hinged to the lower edge of the bin. Lower door section 316 is operated by means of hydraulic door cylinders 318 which interconnect door section 316 to the front and rear walls of the bin.

Power section 100 and control section 300 are pivotally interconnected by means of mating yokes 202 and 204, and a pivot pin 206 passing therethrough. Relative articulated movement of power section 100 and control section 300 is effected by means of hydraulic cylinders 210, which are used to steer the harvester. The left rear corner 311 of bin 310, and the right front corner 107 of power housing 106 are chamfered to provide clearance between power section 100 and control section 300 during sharp turning maneuvers.

Figure 12:
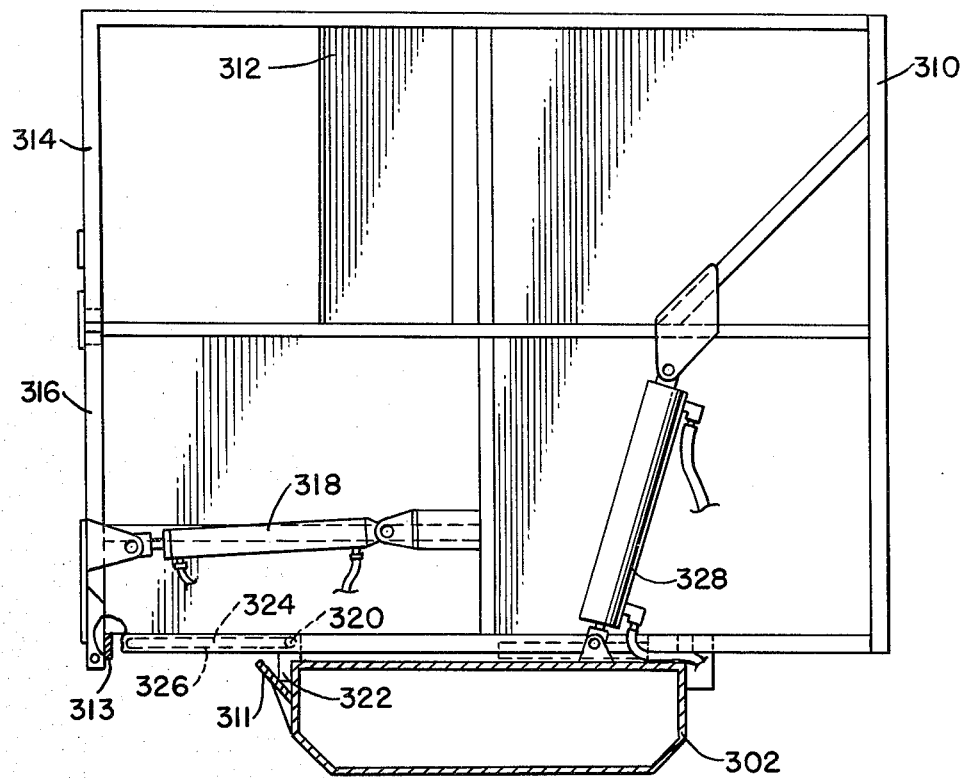
FIG. 12 is a front elevational view of the chip storage bin taken along line 12—12 of FIG. 6.
Figure 13:
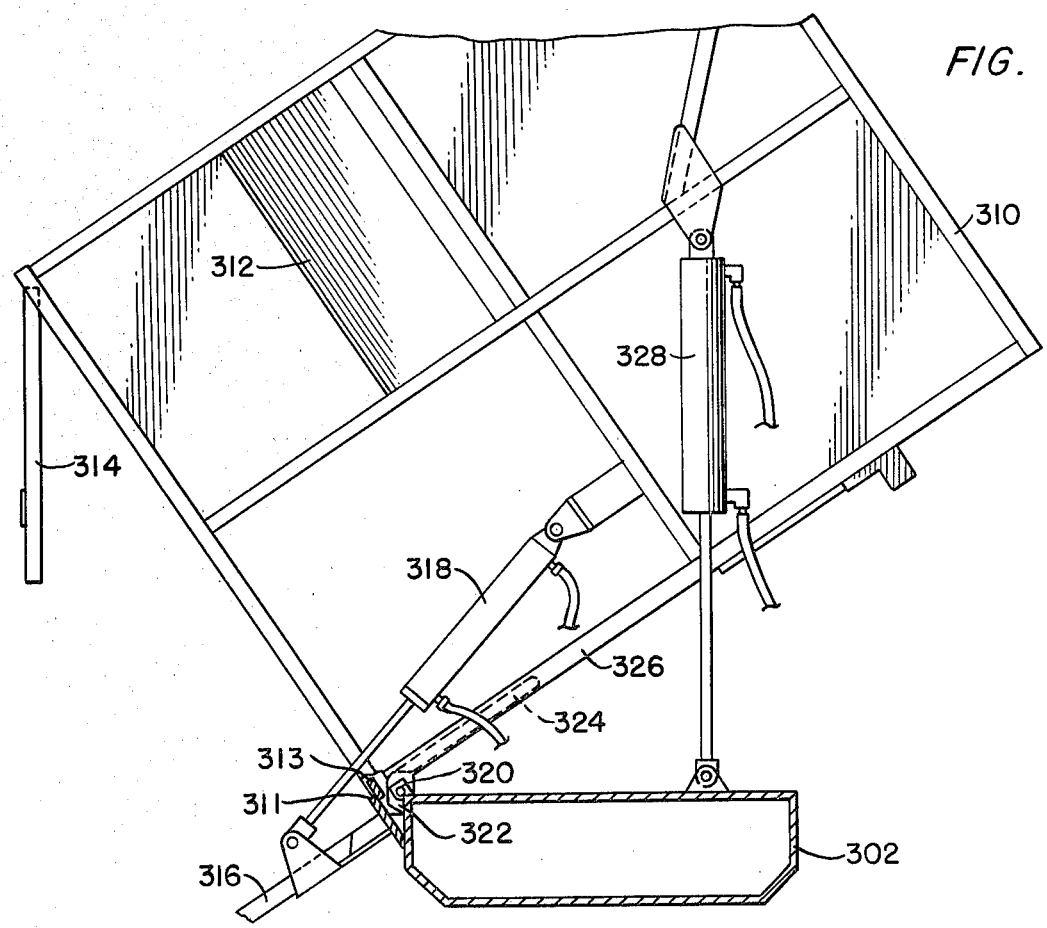
FIG. 13 is a front elevational view of the same showing the bin in its tilted or unloading position.

Referring to FIGS. 12 and 13, the entire bin 310 is pivotally and slidably connected to the right upper edge of chassis 302. This is accomplished by means of a pair of longitudinally spaced pivot pins 320 which are affixed to brackets 322 welded to chassis 302. Each pivot pin 320 is slidably received in a slot 324 formed in a transversely extending strut 326 affixed to the underside of bin 310. A pair of longitudinally spaced dogs 311 affixed to chassis 302 are adapted to mate with a pair of longitudinally spaced dogs 313 on bin 310 during tilting of the bin. Elevation and tilting movement of bin 310 is effected by front and rear hydraulic cylinders 328 and 330, respectively, which pivotally interconnect chassis 302 with bin 310. As cylinders 328 and 330 are extended to raise bin 310, the entire bin slides sideways along pivot pins 320 to initially avoid dangerous lateral shifting of the center of gravity during tilting. The bin then pivots upwardly about pivot pins 320 while mating dogs 311 and 313 engage to provide lateral stability. The lower right edge of bin 310 will then clear the upper run of track 304 when the bin is tilted. Lower door section 316 is opened by door cylinders 318, and provides a discharge ramp or chute for chips, carrying them over track 304 and onto a chip loading bed brought up beside the harvester. Upper door section 314 swings open under the influence of gravity when the bin is tilted.

Referring to FIGS. 4 and 5, harvesting head 400 comprises a frame 402 which is pivotally mounted to the front of chassis 302 by means of a strut 404, a pair of height-adjusting hydraulic cylinders 406 connected to strut 404 and chassis 302, and a tilt-adjusting hydraulic cylinder 408 interconnecting frame 402 with chassis 302. The lower portion of frame 402 is provided with skids 410 which limit downward movement of harvesting head 400 so that the cutting mechanism will not come into contact with the ground, and further distribute the weight of the harvester to reduce soil pressure.

Figure 10:
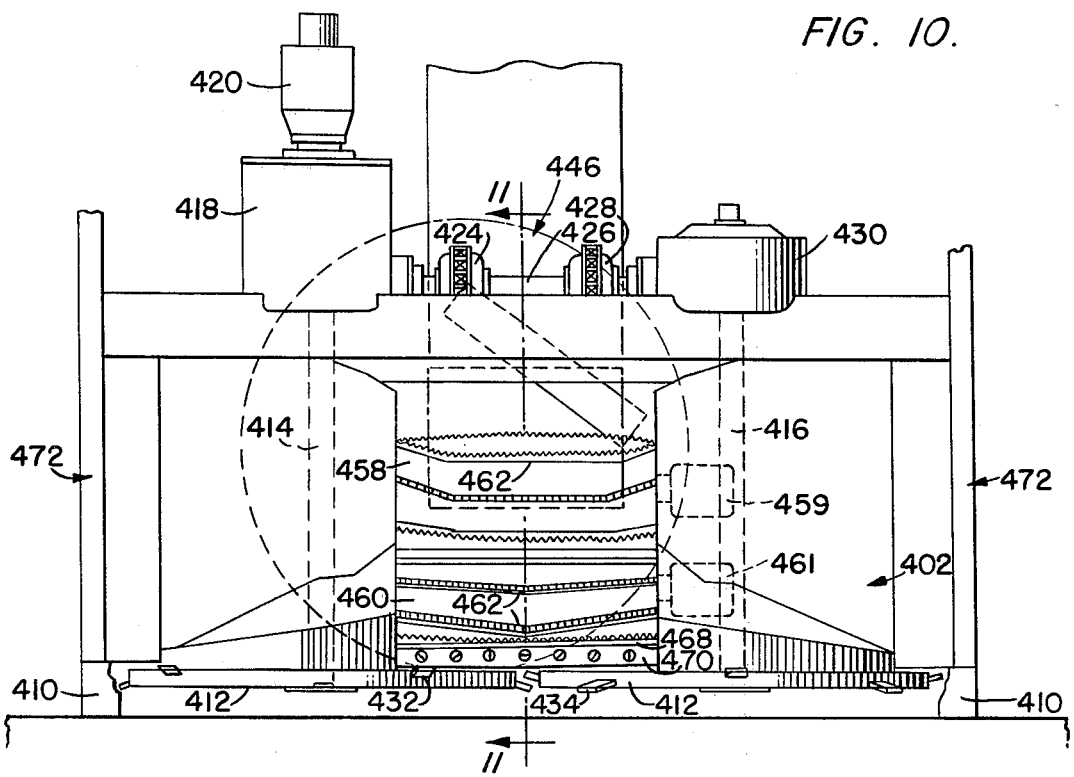
FIG. 10 is an enlarged front elevational view of a portion of the harvesting head.

A pair of counterrotating disk cutters 412 are suitably journalled in bearings (not shown) near the bottom of frame 402. Referring to FIG. 10, the disk cutters are mounted on vertical drive shafts 414 and 416 which extend to the upper portion of frame 402. Drive shaft 414 is driven through a gearbox 418 by an hydraulic motor 420. Drive shaft 416 is also driven by hydraulic motor 420 through gear box 418, coupling 424, shaft 426, coupling 428 and gearbox 430. Disk cutters 412 are thus synchronously driven in counterrotation at a high rate of speed by hydraulic motor 420, with their converging peripheries moving rearwardly at the center of harvesting head 400.

Disk cutters 412 carry cutting teeth 432 and 434 on their peripheries. (See FIGS. 7, 8, 8a, 9 and 9a). Teeth 432 are angled upwardly out of the plane of the disk, while teeth 434 are angled downwardly, the two types of teeth alternating around the periphery of the disk. The disk cutters therefore cut a wide kerf or notch in the trees and brush as the harvester advances. Teeth 432 and 434 are similarly mounted on disk 412 by means of a tooth retaining plate 436 and a bolt 438 which passes through plate 436 and the tooth and is threaded into disk 412 in recess 413. The leading faces 440 of the teeth are bevelled upwardly from their leading cutting edges 442 at an angle of approximately 25° to 65° above the plane of disk 412, 45° being the preferred angle. A reinforcing block 444 is welded to the periphery of the disk behind each cutting tooth.

Bevelled faces 440 of upper cutting teeth 432 act as wedges against the wood above the kerf to exert a constant vertical force which propels the severed tree or brush upwardly away from the ground as the top surface of the disk 42 carries it rearwardly. This tooth design also enables the harvester to sever stumps up to four feet in diameter by essentially progressively chipping and splitting the stump.

A chipper 446 is mounted on frame 402 above and behind the converging portions of disk cutters 412. Chipper 446 is preferably a disk type chipper, such as the type disclosed in U.S. Pat. No. 3,955,765 or U.S. Pat. No. 4,057,192. Such a chipper comprises a disk 448 rotated within a housing 452 by a hydraulic motor 450. The face of the disk comprises a cutting surface to which brushwood and trees are fed over anvil 454. The high rotating speed of disk 448 quickly chops the brushwood and trees into chips, which are centrifugally propelled out of the housing 452 through a discharge chute or conduit 456 into bin 310 through opening 312.

Cut material is fed from disk cutters 412 to chipper 446 by counterrotating feed rollers 458 and 460. These rollers are independently driven by separate hydraulic motors 459 and 461, respectively (see FIG. 10), at a speed commensurate with the maximum feeding rate of material to chipper 446. The surfaces of rollers 458 and 460 carry serrated ribs 462 which are adapted to grip the material and feed it rearwardly. The ribs of lower roller 460 are deeper than those of upper roller 458 to act as paddles which lift the butt ends of the cut material into the throat between the rollers. Lower roller 460 is preferably journalled in frame 402 about a fixed axis slightly ahead of upper roller 458. Upper roller 458 is journalled at the ends of two links 464, which links are pivoted to frame 402 forwardly of roller 458. Links 464 may be allowed to freely pivot up and down under the influence of gravity and the material which is being fed between rollers 458 and 460. However, to provide more positive control of the material feed, two presser cylinders 466 are provided, one for each link 464, for positively moving links 464 downwardly (or upwardly if desired) to apply pressure to the material passing between the rollers. A deflector 468 extends across the lower portion of the opening occupied by rollers 458 and 460 to deflect material upwardly into the throat between the rollers. Deflector 468 may have a wear plate 470 screwed to its forward edge, which may be replaced when worn out.

The perimeter of harvesting head 400 is defined by a tubular space frame 472 which serves to envelop brush and trees and guide them toward disk cutters 412 as the harvester moves forward. A movable portion 474 of this frame is pivoted to frame 402 at pivots 476, and may be moved forward and downward by a hydraulic cylinder 478. Movable frame portion 474 is utilized to bend stiff brushwood and trees forward as they are cut in order to direct their top ends downwardly and propel their butt ends rearwardly toward the feed rollers 458 and 460.

In operation, the harvester is driven forward into a stand of brushwood and trees. The rapidly moving upwardly and downwardly angled cutting teeth 432 and 434 of disk cutters 412 rapidly cut a wide kerf in the standing material and propel the cut material upwardly while the top surfaces of disks 412 draw the butt ends of the material rearwardly. The butt ends of the material then encounter deflector 470, which deflects the material upwardly against lower roller 460 and into the throat between rollers 458 and 460. Upper roller 458 is forced upwardly by the material and, as the two rollers counterrotate, the material is drawn in and propelled rearwardly over anvil 454 of chipper 446. Positive pressure may be applied to material between rollers 458 and 460 by cylinders 466 to positively feed the material to the chipper. If the throat between the rollers becomes clogged, the direction of rotation of the rollers may be reversed to spit out the clogging material forwardly and clear the throat. The material is quickly reduced to chips in chipper 446, which chips are blown through chute 456 through opening 312 into bin 310.

Figure 11:
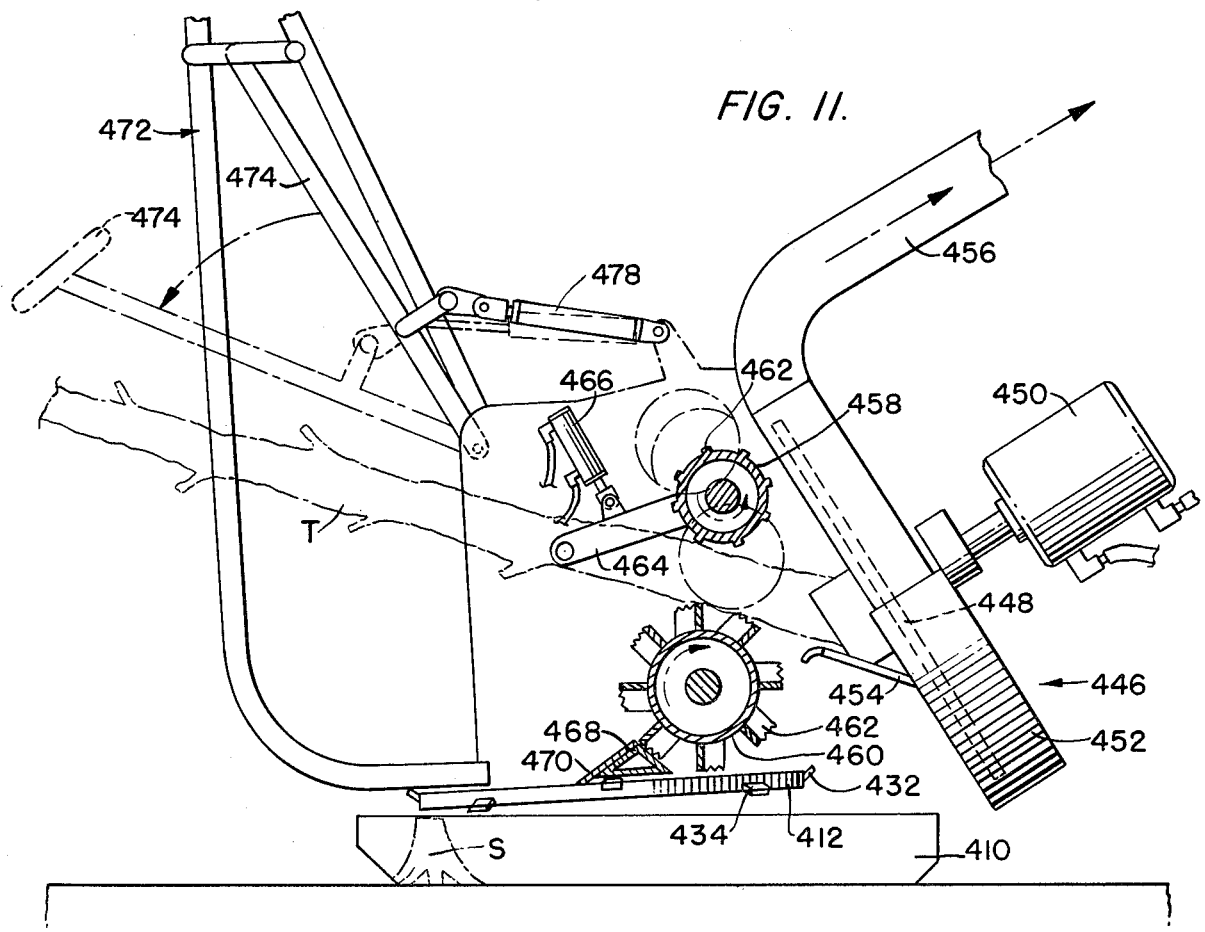
FIG. 11 is a side sectional view of the harvesting head, taken along line 11—11 of FIG. 10, with parts removed to show the relationship of the working elements.

The relationship of the cutting, feeding and chipping mechanisms is clearly shown in FIG. 11, wherein a tree T has been severed, leaving a stump S some 6 to 12 inches high. Ideally, cutting of standing brushwood and trees is most efficiently accomplished with the disk cutters sloped slightly downward in a forward direction, as illustrated in FIG. 11. This will enable the trailing portions of the disk cutters 412 to clear the stumps left behind. Stiff trees or brush may be forced downwardly into a more favorable position for entrance into the throat between rollers 458 and 460 by means of movable frame section 474.

Skids 410 keep disk cutters 412 spaced a minimum distance above the ground so that they will not foul with dirt and wear prematurely. Because the cut material is elevated by the bevelled leading faces of the cutter blades, none of it contacts the soil and therefore remains in a clean condition. This enables the mechanism of the harvesting head 400 to remain substantially clear of dirt and other foreign debris, such as rocks, which would prematurely wear the mechanism. In addition, the chips blown into bin 310 are quite clean, so that they need not necessarily be washed of dirt prior to subsequent use. When bin 310 is substantially full, as can be ascertained by the operator through the rear window of cab 308 and opening 312, forward motion of the harvester is arrested and bin 310 is tilted to dump its contents onto a chip loading bed or a suitable hoppered vehicle which may be driven up alongside the harvester.

The endless track construction of the harvester provides a large ground contacting surface area for distributing the weight of the machine. The pivotal connections between the tracks and the two chassis enable each track to independently conform to the terrain irrespective of the motions of the other tracks, to maximize ground contact and minimize soil pressure. The maximum soil pressure exerted by the harvester is only approximately 7.5 pounds per square inch. This low soil loading makes this harvester especially well adapted for brush and tree clearing in wet, soft, boggy terrain, where conventional wheeled vehicles would have greater difficulty. In addition, its articulated steering mechanism enables it to maneuver very effectively in tight spaces. A substantially uniform width of the harvester enables it to clear a swath approximately eight feet wide, and the large capacity of bin 310 enables the harvester to proceed for approximately one half mile before the chips must be unloaded.

As the harvester proceeds to cut a continuous swath of brush and trees, it might be desirable to selectively thin side rows of the tree plantation by means of a knuckle-boom loader with a shear and grapple mounted on the harvester. Such a loader could be manipulated to selectively harvest trees from side rows and feed them to the throat between rollers 458 and 460 of harvesting head 400. It will be obvious to one of ordinary skill in the art that numerous other modifications may be made without departing from the true spirit and scope of the invention which is to be limited only by the appended claims.

We claim:

1. A mobile, self-propelled bush and tree harvester for severing brush and trees above and close to the ground and reducing the severed material to chips, comprising:
   a chassis;
   drive means carried by said chassis for supporting said chassis on the ground and imparting forward motion thereto;
   chipping means carried by said chassis for reducing the severed material to chips;
   feeding means carried by said chassis ahead of said chipping means for delivering severed material to said chipping means;
   cutting means carried at the front of said chassis ahead of said feeding means for severing brush and trees above and close to the ground as the harvester advances forwardly, and delivering the severed material rearwardly to said feeding means, said cutting means comprising:
   a pair of closely spaced, coplanar, side-by-side, substantially circular cutting disks mounted at the front of said chassis below and at least partially ahead of said feeding means for rotation about spaced, substantially vertical axes, said disks having exposed upper surfaces in the area ahead of said feeding means,
   cutting disk drive means for counterrotating said disks so that their converging peripheries are moving toward the rear of said chassis, whereby the exposed upper surfaces of said disks propel severed material rearwardly toward said feeding means, and
   a plurality of cutting teeth mounted on the periphery of each of said cutting disks for cutting a wide kerf in the brush and trees as the harvester advances forwardly and lifting the severed material; and
   stop means carried by said chassis for maintaining said cutting disks at at least a minimum predetermined height above the ground to prevent contact of said cutting teeth with the ground and any debris on or beneath the ground.

2. A harvester according to claim 1 wherein said cutting teeth have bevelled leading faces which are angled upwardly from their leading cutting edges to lift cut material toward said feeding means.

3. A harvester according to claim 1 or 2 wherein alternate teeth on each disk are angled respectively upwardly and downwardly relative to the plane of rotation of said disk.

4. A harvester according to claim 3 wherein said disks are spaced apart so that the paths of said teeth overlap, and said cutting disk drive means rotates said disks synchronously so that the upwardly and downwardly directed teeth on separate disks converge with one another in overlapping relationship.

5. A harvester according to claim 1 or 2 wherein said feeding means comprises:
   a pair of superposed horizontal feed rollers mounted above and behind a portion of said cutting means and ahead of said chipping means for rotation about horizontal axes transverse to the direction of forward motion of the machine, and relatively movable up and down to define therebetween a feeding throat of variable cross-section; and
   feed roller drive means for counterrotating said rollers so that their converging peripheries are moving toward the rear of the machine to propel severed material toward said chipping means.

6. A harvester according to claim 5 wherein the axis of the upper feed roller is rearwardly offset relative to the axis of the lower feed roller to facilitate feeding of upwardly inclined severed material.

7. A harvester according to claim 6 wherein said feed roller drive means is reversible so that the counterrotation of said feed rollers can be reversed to forwardly expel severed material and avoid a clogging condition in said feeding means or in said chipping means.

8. A harvester according to claim 6 further comprising squeezing means for forcefully urging said feed rollers together to squeeze and grip severed material therebetween.

9. A harvester according to claim 8 wherein said upper feed roller is mounted between two rearwardly extending parallel links which are pivoted at their forward ends to a frame portion of the harvester, and said squeezing means comprises a power cylinder interconnecting each of said links with said frame portion for positively moving said links and said upper feed roller relative to the lower feed roller.

10. A harvester according to claim 1 or 2 further comprising a chip storage bin mounted behind said chipping means, and a chip conduit connected to said chipping means for directing chips into said bin.

11. A harvester according to claim 10 further comprising chip unloading means for tilting said bin to the side of said harvester to dump chips therefrom.

12. A harvester according to claim 1 or 2 wherein said cutting means, chipping means and feeding means are mounted on the front end of the forward control chassis of a two-chassis, articulated, endless track vehicle, the aft power chassis of said vehicle comprising power supply means for supplying motive power to said endless tracks, cutting means, chipping means, feeding means and other harvester equipment.

13. A harvester according to claim 1 further comprising pitch control means for adjusting the vertical pitch of said cutting means relative to said chassis.

14. A harvester according to claim 1 wherein said stop means comprises bottom skid means mounted alongside said cutting disks for engaging the ground to maintain the height of said cutting disks and distribute the weight of said cutting means.

15. A harvester according to claim 1 wherein said feeding means and said chipping means are spaced from one another to provide a gap for the drop out of debris.

16. A harvester according to claim 15 wherein said gap is located above the rear portions of said disks so that said debris falls onto said disks and is thrown outwardly thereby.

17. A mobile, self-propelled brush and tree harvester comprising:
   a chassis;
   a pair of endless driven tracks extending along the sides of said chassis for supporting the harvester on the ground;
   cutting means mounted at the front of said chassis for severing brush and trees above and close to the ground;
   chipping means mounted on said chassis behind said cutting means for reducing cut material to chips;
   feeding means mounted on said chassis between said cutting means and said chipping means for feeding the cut material to said chipping means;
   a chip storage bin mounted on said chassis behind said chipping means, said bin including a discharge door hinged to said bin along its lower means, said bin including a discharge door hinged to said bin along its lower bottom side edge;
   a chip conduit connected to said chipping means for directing chips to said bin; and
   chip unloading means for tilting said bin to the side of said chassis and for lowering said door to an open position when said bin is tilted so that said door overlies the adjacent track to act as a chute for directing chips to a location along said adjacent track.

18. A mobile, self-propelled brush and tree harvester for severing brush and trees above and close to soft, boggy ground and reducing the severed material to chips, comprising:
   a forward control chassis mounted on a pair of driven endless tracks which extend beyond the side edges of said control chassis;
   an aft power chassis hinged to the rear of said control chassis and mounted on a pair of driven endless tracks;
   a harvesting head attached to the front of said control chassis and comprising cutting means for severing brush and trees close to the ground, chipping means for reducing the severed material to chips, and feeding means for feeding the severed material from said cutting means to said chipping means;
   a chip storage bin mounted on said control chassis, a chip conduit connected to said chipping means for directing chips into said bin, and a discharge door hinged to a bottom side edge of said bin, said bin extending beyond the sides of said control chassis;
   chip unloading means for tilting said bin to the side of said control chassis adjacent said discharge door, for repositioning said bin with said bottom side edge closer to said control chassis, and for lowering said door to an open position to overlie the adjacent track when said bin is tilted and serve as a chute for chips dumped from said bin by directing said chips to a location alongside said adjacent track;
   steering means interconnecting said control chassis and said power chassis for varying the articulated angle between said control chassis and said power chassis to steer the harvester;
   power supply means mounted on said power chassis for supplying motive power to all of said endless tracks, steering means, cutting means, chipping means, feeding means and other harvester equipment; and
   control means mounted on said control chassis for controlling the application of power to said harvester equipment.

19. A harvester according to claim 18 wherein said unloading means comprises a pair of aligned, spaced pivot pins mounted on said control chassis;
   a pair of spaced parallel slotted supports affixed to the underside of said bin adjacent said lower bottom side edge thereof and extending transversely of said control chassis, each slotted support receiving one of said pivot pins therein; and
   at least one power tilt cylinder interconnecting said control chassis and said bin for raising said bin so that it slides along said pivot pins until said lower bottom side edge of said bin is adjacent to said control chassis.

20. In a mobile, self-propelled brush and tree harvester having a chassis, cutting means mounted on said chassis for severing brush and trees above and close to the ground, chipping means mounted on said chassis behind said cutting means for reducing severed material to chips, and feeding means mounted on said chassis between said cutting means and said chipping means for feeding the severed material to said chipping means, the improvement comprising:
   a chip storage bin mounted on said chassis behind said chipping means, said bin being wider than said chassis so that the bottom side edges of said bin project beyond said chassis;
   a chip conduit connected to said chipping means for directing chips to said bin; and
   chip unloading means for tilting said bin to the side of said chassis to dump chips, therefrom, said chip unloading means comprising a pair of aligned, spaced pivot pins mounted on said chassis, and a pair of spaced, slotted supports affixed to the underside of said bin adjacent a bottom side edge of said bin and extending transversely of said chassis, each slotted support receiving one of said pivot pins so that said bin slides along said pivot pins as tilting movement of the bin is initiated to reposition said bin with the lower of its bottom side edges closer to said chassis than it is when said bin is not tilted.

21. A harvester according to claim 20 further comprising a discharge door hinged to said bin along said lower bottom side edge, said chip unloading means further comprising a power door cylinder interconnecting said bin and said door for lowering said door to an open position when said bin is tilted.

22. A harvester according to claim 20 wherein said chip unloading means comprises a pair of power tilt cylinders flanking said bin on the front and rear sides thereof and interconnecting said chassis and said bin.

23. A harvester according to claim 20 wherein said chassis is supported on a pair of endless tracks and said discharge door overlies one of said tracks when said bin is raised to act as a chute for directing chips to a location alongside said one track.

\* \* \* \* \*